(12) United States Patent
Li et al.

(10) Patent No.: US 11,100,893 B2
(45) Date of Patent: Aug. 24, 2021

(54) EYE PROTECTION METHOD AND SYSTEM FOR INTELLIGENT TERMINAL

(71) Applicant: Chinese Academy of Medical Sciences & Peking Union Medical College Institute of Biomedical Engineering, Tianjin (CN)

(72) Inventors: Yingxin Li, Tianjin (CN); He Huang, Tianjin (CN); Huijuan Yin, Tianjin (CN); Xiaoxi Dong, Tianjin (CN)

(73) Assignee: Chinese Academy of Medical Sciences & Peking Union Medical College, Institute of Biomedical Engineering, Tianjin (CN)

( * ) Notice: Subject to any disclaimer, the term of this patent is extended or adjusted under 35 U.S.C. 154(b) by 26 days.

(21) Appl. No.: 16/734,013

(22) Filed: Jan. 3, 2020

(65) Prior Publication Data
US 2020/0312274 A1     Oct. 1, 2020

(30) Foreign Application Priority Data
Mar. 28, 2019   (CN) .......................... 201910242634.0

(51) Int. Cl.
*G09G 5/10* (2006.01)
*G09G 3/20* (2006.01)
*H04M 1/72454* (2021.01)
*G06K 9/00* (2006.01)
(Continued)

(52) U.S. Cl.
CPC ....... *G09G 5/10* (2013.01); *G09G 2320/0626* (2013.01); *G09G 2320/0666* (2013.01); *G09G 2360/14* (2013.01)

(58) Field of Classification Search
CPC .... G09G 5/10; G09G 3/20; G09G 2320/0626; G09G 2320/0666; G09G 2320/14; G09G 2354/00; G06K 9/00281; H04M 1/72406; H04M 1/72454; H04M 1/026; H04M 1/0264
See application file for complete search history.

(56) References Cited

U.S. PATENT DOCUMENTS

| | | | | |
|---|---|---|---|---|
| 2008/0117323 | A1* | 5/2008 | Sakamoto | G09G 5/00 348/333.01 |
| 2009/0278828 | A1* | 11/2009 | Fletcher | G06F 1/3203 345/207 |

(Continued)

*Primary Examiner* — David Tung
(74) *Attorney, Agent, or Firm* — Bayramoglu Law Offices L.L.C

(57) ABSTRACT

The present invention discloses an eye protection method and system for an intelligent terminal, which uses a light sensor to acquire ambient light, uses a distance sensor to acquire a distance between a user's eyes and a screen of the intelligent terminal, uses a camera to identify a user identity, and uses eye protection software to monitor display content and perform data analysis, thereby achieving automatic adjustment of screen brightness, automatic adjustment of screen color temperature, adjustment of display mode, automatic restriction of use time, switching to basic communication function, and so on. The present invention intelligently adjusts the eye protection threshold, improves the practicability and effectiveness of the eye protection method, and improves the experience effect of the user's eye protection function.

8 Claims, 1 Drawing Sheet

(51) Int. Cl.
*H04M 1/02* (2006.01)
*H04M 1/72406* (2021.01)

(56) References Cited

U.S. PATENT DOCUMENTS

| | | | |
|---|---|---|---|
| 2011/0134091 A1* | 6/2011 | Chen | G09G 3/3406 345/207 |
| 2011/0181541 A1* | 7/2011 | Kuo | G06F 1/1686 345/174 |
| 2013/0082991 A1* | 4/2013 | Lin | G09G 5/00 345/207 |
| 2014/0139560 A1* | 5/2014 | Jung | G09G 3/20 345/690 |
| 2015/0212575 A1* | 7/2015 | Song | G06F 3/167 345/156 |
| 2016/0293139 A1* | 10/2016 | Kwon | G06F 3/0482 |
| 2018/0226055 A1* | 8/2018 | Raymann | G06F 3/015 |

* cited by examiner

EYE PROTECTION METHOD AND SYSTEM FOR INTELLIGENT TERMINAL

CROSS REFERENCE TO RELATED APPLICATIONS

This application claims priority from Chinese application number 201910242634.0, filed Mar. 28, 2019, the disclosure of which is hereby incorporated herein by reference.

TECHNICAL FIELD

The present invention relates to the field of display technologies, and in particular, to an eye protection method and system for an intelligent terminal.

BACKGROUND

Nowadays, "intelligent terminals" such as mobile phones, tablets, and handheld computers have gradually become an indispensable part in people's lives. Such video terminals generally have high resolution and high brightness, and display a large amount of information in a small display area. When people attentively and continuously watch a screen for a long time, the constantly changing light and shadow on the screen will cause continuous stimulation on eyes. When the eyes keep capturing these light and shadow, it will cause damage to the tear film layer on the surface of the eyeball, thereby aggravating the feelings of fatigue, dryness, itching, and even the eyes having stinging, tearing, photophobia, and other symptoms. The resulting eye fatigue is summarized by ophthalmologists as one of the manifestations of "video terminal syndrome".

There are three main causes for video terminal syndrome: blue light stimulation, too short viewing distance, and too long viewing time. The blue light radiation causes more than 30,000 people worldwide to be blind every year, and 63.3% of 420 million netizens in China have different degrees of eye diseases such as vision loss, cataract, astigmatism, and blindness due to blue light and radiation. Too short viewing distance and too long viewing time not only exacerbate the damage of blue light, but also cause fatigue of ciliary muscles in eyes, thus resulting in visual impairment. At present, the commonly used video terminal eye protection methods mainly include: adjusting screen parameters, displaying viewing time, increasing background brightness, adding a light filtering device, forcing an eye protection action, and so on. While the existing eye protection methods for a video terminal basically use one or several of the above methods, have problems such as insufficient intelligence level and poor user experience.

SUMMARY

The objective of the present invention is to provide an eye protection method and system for an intelligent terminal, to achieve the technical effect of effective eye protection.

To achieve the above purpose, the present invention provides the following technical solutions.

An eye protection method for an intelligent terminal includes:

acquiring, by a light sensor, intensity of light in an environment in which the intelligent terminal is located, and adjusting a display brightness of the intelligent terminal according to the intensity of the light;

acquiring, by a distance sensor, a distance between a user's eyes and a screen of the intelligent terminal, and causing the intelligent terminal to perform a first eye protection scheme according to the distance;

obtaining, by eye protection software, content displayed by the intelligent terminal, and causing the intelligent terminal to perform a second eye protection scheme according to the displayed content; and acquiring, by a camera, facial information of the user, and causing the intelligent terminal to perform a third eye protection scheme according to the facial information.

Optionally, the acquiring, by a light sensor, intensity of light in an environment in which the intelligent terminal is located, and the adjusting a display brightness of the intelligent terminal according to the intensity of the light specifically includes:

acquiring, by the light sensor, the intensity of the light in the environment in which the intelligent terminal is located;

comparing the intensity of the light with a light threshold; and when the intensity of the light is less than the light threshold, lowering display brightness of the intelligent terminal.

Optionally, the acquiring, by a distance sensor, a distance between a user's eyes and a screen of the intelligent terminal, and causing the intelligent terminal to perform a first eye protection scheme according to the distance specifically includes:

acquiring, by the distance sensor, the distance between the user's eyes and the screen of the intelligent terminal;

comparing the distance with a distance threshold;

when the distance is less than the threshold, switching, by the eye protection software, a display mode of the intelligent terminal to a black-and-white display mode, and sending a reminder signal for distance adjustment; and when the time that the distance is less than the threshold is greater than a first time threshold, switching, by the eye protection software, an operating mode of the intelligent terminal to a basic communication mode.

Optionally, the obtaining, by eye protection software, content displayed by the intelligent terminal, and causing the intelligent terminal to perform a second eye protection scheme according to the displayed content specifically includes:

obtaining, by the eye protection software, the content displayed by the intelligent terminal;

when the displayed content is a single text, increasing screen display color temperature of the intelligent terminal;

when the displayed content is a game, comparing game time with a second time threshold; when the game time is greater than the second time threshold, switching, by the eye protection software, a display mode of the intelligent terminal to a black-and-white display mode; and when the time that the game time is greater than the second time threshold is greater than a third time threshold, switching, by the eye protection software, an operating mode of the intelligent terminal to a basic communication mode.

Optionally, the acquiring, by a camera, facial information of the user, and causing the intelligent terminal to perform a third eye protection scheme according to the facial information specifically include:

acquiring, by the camera, the facial information of the user;

obtaining time that the user uses the intelligent terminal according to the comparison between the facial information and the information stored by the intelligent terminal;

when the time of using the intelligent terminal is greater than a fourth time threshold, switching, by the eye protection software, a display mode of the intelligent terminal to a black-and-white display mode, and sending a reminder message for rest; and when the rest time is less than a fifth time threshold, maintaining the display mode of the intelligent terminal to the black-and-white display mode.

An eye protection system for an intelligent terminal includes:

a brightness adjustment module, configured to adjust a display brightness of the intelligent terminal according to intensity of light, that is acquired by a light sensor, in an environment in which the intelligent terminal is located;

a first eye protection scheme execution module, configured to cause the intelligent terminal to perform a first eye protection scheme according to a distance, acquired by a distance sensor, between a user's eyes and a screen of the intelligent terminal;

a second eye protection scheme execution module, configured to cause the intelligent terminal to perform a second eye protection scheme according to the content, displayed by the intelligent terminal, that is obtained by eye protection software; and a third eye protection scheme execution module, configured to cause the intelligent terminal to perform a third eye protection scheme according to facial information of the user that is acquired by a camera.

Optionally, the brightness adjustment module specifically includes:

a light intensity acquiring unit, configured to acquire, by the light sensor, the intensity of the light of the environment in which the intelligent terminal is located;

a brightness comparing unit, configured to compare the intensity of the light with a light threshold; and a display brightness adjustment unit, configured to reduce display brightness of the intelligent terminal when the intensity of the light is less than the light threshold.

Optionally, the first eye protection scheme execution module specifically includes: a distance acquiring unit, configured to acquire, by the distance sensor, the distance between the user's eyes and the screen of the intelligent terminal;

a distance comparing unit, configured to compare the distance and a distance threshold;

a display mode switching unit, configured to: when the distance is less than the threshold, switch, by the eye protection software, a display mode of the intelligent terminal to a black-and-white display mode, and send a reminder signal for distance adjustment; and a communication mode switching unit, configured to: when the time that the distance is less than the threshold is greater than a first time threshold, switch, by the eye protection software, an operating mode of the intelligent terminal to a basic communication mode.

Optionally, the second eye protection scheme execution module specifically includes:

a display content obtaining unit, configured to obtain, by the eye protection software, content displayed by the intelligent terminal;

a color temperature increasing unit, configured to: when the displayed content is a single text, increase a screen display color temperature of the intelligent terminal;

a display mode switching unit, configured to: when the displayed content is a game, compare game time with a second time threshold; and when the game time is greater than the second time threshold, switch, by the eye protection software, a display mode of the intelligent terminal to a black-and-white display mode; and a communication mode switching unit, configured to: when the time that the game time is greater than the second time threshold is greater than a third time threshold, switch, by the eye protection software, an operating mode of the intelligent terminal to a basic communication mode.

Optionally, the third eye protection scheme execution module specifically includes:

a facial information acquiring unit, configured to acquire, by the camera, facial information of the user;

a use time determining unit, configured to obtain time that the user uses the intelligent terminal according to the comparison between the facial information and the information stored by the intelligent terminal;

a display mode switching unit, configured to: when the time of using the intelligent terminal is greater than a fourth time threshold, switch, by the eye protection software, a display mode of the intelligent terminal to a black-and-white display mode, and sending a reminder message for rest; and a display mode maintaining unit, configured to: when the rest time is less than a fifth time threshold, maintain the display mode of the intelligent terminal to the black-and-white display mode.

According to the specific embodiment provided in the present invention, the present invention discloses the following technical effects: The present invention is provided with hardware devices such as a light sensor, a distance sensor, and a camera, which respectively acquire ambient light, the distance between the user's eyes and the screen of the intelligent terminal, and the user identity, and achieve comprehensive identification of the usage environment and usage status of users. The present invention also provides eye protection software, which can monitor the display content of the intelligent terminal in real time and perform data analysis, thereby intelligently adjusting the eye protection threshold. The present invention comprehensively utilizes hardware and software to realize automatic adjustment of screen brightness, automatic adjustment of screen color temperature, adjustment of display mode, automatic restriction of use time, switching to basic communication function, and so on, improves the practicability and effectiveness of the eye protection method, and improves the experience effect of the user's eye protection function.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide an eye protection method and system for an intelligent terminal, which improves the practicability and effectiveness of the eye protection method, and improves the experience effect of the user's eye protection function.

To make the foregoing objective, features, and advantages of the present invention clearer and more comprehensible, the present invention is further described in detail below with reference to the accompanying drawings and specific embodiments.

Embodiment

Figure 1:
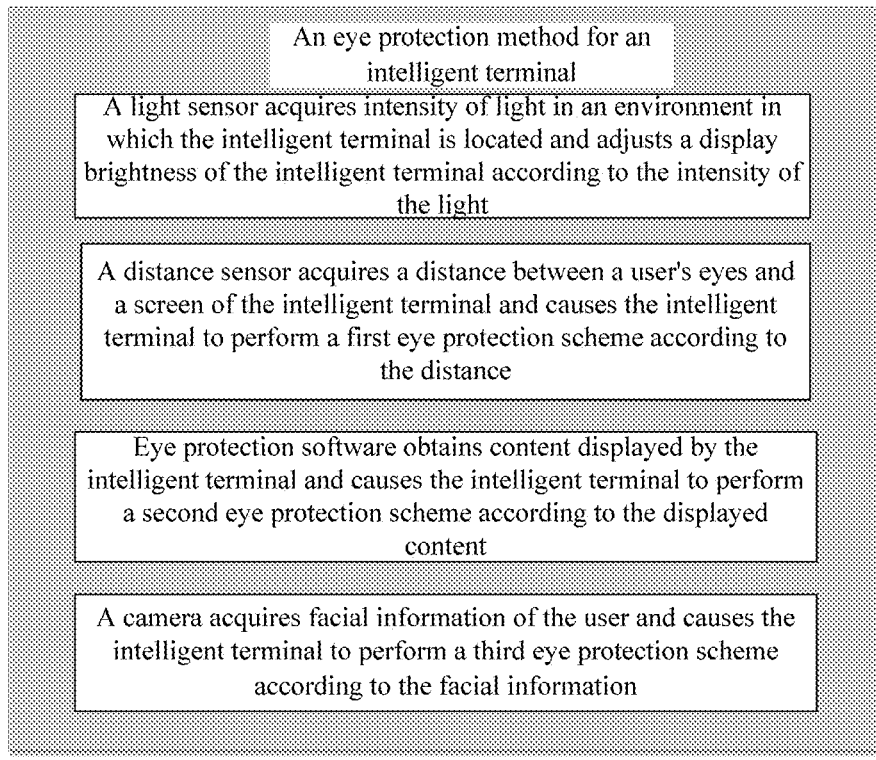
FIG. 1 is a schematic diagram of an eye protection method for an intelligent terminal according to an embodiment of the present invention.

As shown in FIG. 1, the eye protection method for the intelligent terminal of the present invention includes:

A light sensor acquires intensity of light in an environment in which the intelligent terminal is located, and adjusts a display brightness of the intelligent terminal according to the intensity of the light.

The light sensor acquires the intensity of the light in the environment in which the intelligent terminal is located, and compares the intensity of the light with a light threshold; and when the intensity of the light is less than the light threshold, reduces display brightness of the intelligent terminal.

The brightness difference between the intelligent terminal and the environment is reduced according to real-time adjustment of the display brightness of the intelligent terminal by an external light, thereby achieving the effect of relieving eye fatigue.

A distance sensor acquires a distance between a user's eyes and a screen of the intelligent terminal, and causes the intelligent terminal to perform a first eye protection scheme according to the distance.

The distance sensor acquires the distance between the user's eyes and the screen of the intelligent terminal, and compares the distance with a distance threshold; and when the distance is less than the threshold, the eye protection software switches a display mode of the intelligent terminal to a black-and-white display mode, and sends a reminder signal for distance adjustment.

When the time that the distance is less than the threshold is greater than a first time threshold, the eye protection software switches an operating mode of the intelligent terminal to a basic communication mode.

By monitoring the distance between the user's eyes and the screen of the intelligent terminal, it is possible to timely judge close-range viewing situation, ensure a comfortable viewing distance through the black-and-white display mode and the signal reminder, and reduce stimulation of the intelligent terminal screen on eyes.

The eye protection software obtains content displayed by the intelligent terminal, and causes the intelligent terminal to perform a second eye protection scheme according to the displayed content.

The eye protection software obtains the content displayed by the intelligent terminal; when the displayed content is a single text, the screen display color temperature of the intelligent terminal is increased, to reduce the light output of the blue light wave band and reduce the harm of blue light.

When the displayed content is a game, the game time is compared with a second time threshold; when the game time is greater than the second time threshold, the eye protection software switches a display mode of the intelligent terminal to a black-and-white display mode; and when the time that the game time is greater than the second time threshold is greater than a third time threshold, the eye protection software switches an operating mode of the intelligent terminal to a basic communication mode.

By limiting the game time, it not only can reduce the visual fatigue, but also can prevent from being indulged in game for a long time, without affecting the communication function.

A camera acquires facial information of the user, and causes the intelligent terminal to perform a third eye protection scheme according to the facial information.

The camera acquires the facial information of the user, and obtains time that the user uses the intelligent terminal according to the comparison between the facial information and the information stored by the intelligent terminal; when the time of using the intelligent terminal is greater than a fourth time threshold, the eye protection software switches a display mode of the intelligent terminal to a black-and-white display mode, and sends a reminder message for rest; and when the rest time is less than a fifth time threshold, the display mode of the intelligent terminal is maintained to the black-and-white display mode.

Through the acquisition of user information by the camera, the user's identity can be identified and the user can be prevented from watching the mobile phone in a short interval of time, thereby achieving a good supervision effect.

The present invention comprehensively utilizes the software and hardware devices, to realize the comprehensive identification of the user's use environment and use state and the intelligent adjustment of the eye protection threshold, improve the practicability and effectiveness of the eye protection method, and improve the experience effect of the user's eye protection function.

Figure 2:
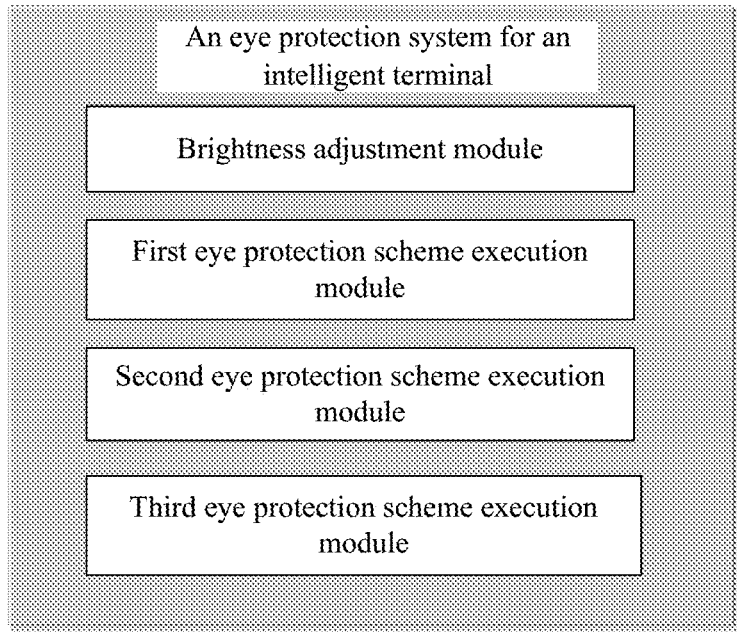
FIG. 2 is a schematic diagram of an eye protection system for an intelligent terminal according to an embodiment of the present invention.

As shown in FIG. 2, the eye protection system for the intelligent terminal of the present invention includes: a brightness adjustment module, a first eye protection scheme execution module, a second eye protection scheme execution module, and a third eye protection scheme execution module.

The brightness adjustment module is configured to adjust a display brightness of the intelligent terminal according to intensity of light, that is acquired by a light sensor, in an environment in which the intelligent terminal is located.

The brightness adjustment module includes: a light intensity acquiring unit, a brightness comparing unit, and a display brightness adjustment unit.

The light intensity acquiring unit is configured to acquire, by the light sensor, the intensity of the light of the environment in which the intelligent terminal is located.

The brightness comparing unit is configured to compare the intensity of the light with a light threshold.

The display brightness adjustment unit is configured to reduce display brightness of the intelligent terminal when the intensity of the light is less than the light threshold.

The brightness difference between the intelligent terminal and the environment is reduced according to real-time adjustment of the display brightness of the intelligent terminal by an external light, thereby achieving the effect of relieving eye fatigue.

The first eye protection scheme execution module is configured to cause the intelligent terminal to perform a first eye protection scheme according to a distance, acquired by a distance sensor, between a user's eyes and a screen of the intelligent terminal.

The first eye protection scheme execution module includes: a distance acquiring unit, a distance comparing unit, a display mode switching unit, and a communication mode switching unit.

The distance acquiring unit is configured to acquire, by the distance sensor, the distance between the user's eyes and the screen of the intelligent terminal.

The distance comparing unit is configured to compare the distance and a distance threshold.

The display mode switching unit is configured to: when the distance is less than the threshold, switch, by the eye protection software, a display mode of the intelligent terminal to a black-and-white display mode, and send a reminder signal for distance adjustment.

The communication mode switching unit is configured to: when the time that the distance is less than the threshold is greater than a first time threshold, switch, by the eye protection software, an operating mode of the intelligent terminal to a basic communication mode.

By monitoring the distance between the user's eyes and the screen of the intelligent terminal, it is possible to timely judge close-range viewing situation, ensure a comfortable viewing distance through the black-and-white display mode and the signal reminder, and reduce stimulation of the intelligent terminal screen on eyes.

The second eye protection scheme execution module is configured to cause the intelligent terminal to perform a second eye protection scheme according to the content, displayed by the intelligent terminal, that is obtained by eye protection software.

The second eye protection scheme execution module includes: a display content obtaining unit, a color temperature increasing unit, a display mode switching unit, and a communication mode switching unit.

The display content obtaining unit is configured to obtain, by the eye protection software, content displayed by the intelligent terminal.

The color temperature increasing unit is configured to: when the displayed content is a single text, increase a screen display color temperature of the intelligent terminal.

The display mode switching unit is configured to: when the displayed content is a game, compare game time with a second time threshold; and when the game time is greater than the second time threshold, switch, by the eye protection software, a display mode of the intelligent terminal to a black-and-white display mode.

The communication mode switching unit is configured to: when the time that the game time is greater than the second time threshold is greater than a third time threshold, switch, by the eye protection software, an operating mode of the intelligent terminal to a basic communication mode.

By limiting the game time, it not only can reduce the visual fatigue, but also can prevent from being indulged in game for a long time, without affecting the communication function.

The third eye protection scheme execution module is configured to cause the intelligent terminal to perform a third eye protection scheme according to facial information of the user that is acquired by a camera.

The third eye protection scheme execution module includes: a facial information acquiring unit, a use time determining unit, a display mode switching unit, and a display mode maintaining unit.

The facial information acquiring unit is configured to acquire, by the camera, facial information of the user.

The use time determining unit is configured to obtain time that the user uses the intelligent terminal according to the comparison between the facial information and the information stored by the intelligent terminal.

The display mode switching unit is configured to: when the time of using the intelligent terminal is greater than a fourth time threshold, switch, by the eye protection software, a display mode of the intelligent terminal to a black-and-white display mode, and sending a reminder message for rest.

The display mode maintaining unit is configured to: when the rest time is less than a fifth time threshold, maintain the display mode of the intelligent terminal to the black-and-white display mode.

Through the acquisition of user information by the camera, the user's identity can be identified and the user can be prevented from watching the mobile phone in a short interval of time, thereby achieving a good supervision effect.

The present invention comprehensively utilizes the software and hardware devices, to realize the comprehensive identification of the user's use environment and use state and the intelligent adjustment of the eye protection threshold, improve the practicability and effectiveness of the eye protection method, and improve the experience effect of the user's eye protection function.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. An eye protection method for an intelligent terminal, wherein the eye protection method comprises:
    acquiring, by a light sensor, intensity of light in an environment in which the intelligent terminal is located, and adjusting a display brightness of the intelligent terminal according to the intensity of the light;
    acquiring, by a distance sensor, a distance between a user's eyes and a screen of the intelligent terminal, and causing the intelligent terminal to perform a first eye protection scheme according to the distance;
    obtaining, by eye protection software, content displayed by the intelligent terminal, and causing the intelligent terminal to perform a second eye protection scheme according to the displayed content; and
    acquiring, by a camera, facial information of the user, and causing the intelligent terminal to perform a third eye protection scheme according to the facial information,
    wherein the acquiring, by the distance sensor, the distance between the user's eyes and the screen of the intelligent terminal, and causing the intelligent terminal to perform the first eye protection scheme according to the distance specifically comprises:
    acquiring, by the distance sensor, the distance between the user's eyes and the screen of the intelligent terminal;
    comparing the distance with a distance threshold;

when the distance is less than the threshold, switching, b the eye protection software, a display mode of the intelligent terminal to a black-and-white display mode, and sending a reminder signal for distance adjustment; and when the time that the distance is less than the threshold is greater than a first time threshold, switching, by the eye protection software, an operating mode of the intelligent terminal to a basic communication mode.

2. The eye protection method for the intelligent terminal according to claim 1, wherein the acquiring, by the light sensor, the intensity of light in the environment in which the intelligent terminal is located, and the adjusting the display brightness of the intelligent terminal according to the intensity of the light specifically comprises:

acquiring, by the light sensor, the intensity of the light in the environment in which the intelligent terminal is located;

comparing the intensity of the light with a light threshold; and when the intensity of the light is less than the light threshold, lowering display brightness of the intelligent terminal.

3. An eye protection method for an intelligent terminal, wherein the eye protection method comprises:

acquiring, by a light sensor, intensity of tight in an environment in which the intelligent terminal is located, and adjusting a display brightness of the intelligent terminal according to the intensity of the light;

acquiring by a distance sensor, a distance between a user's eyes and a screen of the intelligent terminal, and causing the intelligent terminal to perform a first eye protection scheme according to the distance;

obtaining, by eye protection software, content displayed by the intelligent terminal, and causing the intelligent terminal to perform a second eye protection scheme according to the displayed content; and acquiring, by a camera, facial information of the user, and causing the intelligent terminal to perform a third eye protection scheme according to the facial information, wherein the obtaining, by the eye protection software, the content displayed by the intelligent terminal, and causing the intelligent terminal to perform the second eye protection scheme according to the displayed content specifically comprises:

obtaining, by the eye protection software, the content displayed by the intelligent terminal;

when the displayed content is a single text, increasing screen display color temperature of the intelligent terminal;

when the displayed content is a game, comparing game time with a second time threshold;

when the game time is greater than the second time threshold, switching, by the eye protection software, a display mode of the intelligent terminal to a black-and-white display mode; and when the time that the game time is greater than the second time threshold is greater than a third time threshold, switching, by the eye protection software, an operating mode of the intelligent terminal to a basic communication mode.

4. The eye protection method for the intelligent terminal according to claim wherein the acquiring, by the camera, the facial information of the user, and causing the intelligent terminal to perform the third eye protection scheme according to the facial information specifically comprise:

acquiring, by the camera, the facial information of the user;

obtaining time that the user uses the intelligent terminal according to the comparison between the facial information and the information stored by the intelligent terminal;

when the time of using the intelligent terminal is greater than a fourth time threshold, switching, by the eye protection software, a display mode of the intelligent terminal to a black-and-white display mode, and sending a reminder message for rest; and when the rest time is less than a fifth time threshold, maintaining the display mode of the intelligent terminal to the black-and-white display mode.

5. An eye protection system for an intelligent terminal, wherein the eye protection system comprises:

a brightness adjustment module, configured to adjust a display brightness of the intelligent terminal according to intensity of light, that is acquired by a light sensor, in an environment in which the intelligent terminal is located;

a first eye protection scheme execution module, configured to cause the intelligent terminal to perform a first eye protection scheme according to a distance, acquired by a distance sensor, between a user's eyes and a screen of the intelligent terminal;

a second eye protection scheme execution module, configured to cause the intelligent terminal to perform a second eye protection scheme according to a content, displayed by the intelligent terminal, that is obtained by eye protection software; and a third eye protection scheme execution module, configured to cause the intelligent terminal to perform a third eye protection scheme according to facial information of the user that is acquired by a camera, wherein the first eye protection scheme execution module specifically comprises:

a distance acquiring unit, configured to acquire, by the distance sensor, the distance between the user's eyes and the screen of the intelligent terminal;

a distance comparing unit, configured to compare the distance and a distance threshold;

a display mode switching unit, configured to: when the distance is less than the threshold, switch, by the eye protection software, a display mode of the intelligent terminal to a black-and-white display mode, and send a reminder signal for distance adjustment; and a communication mode switching unit, configured to: when the time that the distance is less than the threshold is greater than a first time threshold, switch, by the eye protection software, an operating mode of the intelligent terminal to a basic communication mode.

6. The eye protection system for the intelligent terminal according to claim 5, wherein the brightness adjustment module specifically comprises:

a light intensity acquiring unit, configured to acquire, by the light sensor, the intensity of the light of the environment in which the intelligent terminal is located;

a brightness comparing unit, configured to compare the intensity of the light with a light threshold; and a display brightness adjustment unit, configured to reduce display brightness of the intelligent terminal when the intensity of the light is less than the light threshold.

7. The eye protection system for the intelligent terminal according to claim 5, wherein the second eye protection scheme execution module specifically comprises:

a display content obtaining unit, configured to obtain, by the eye protection software, content displayed by the intelligent terminal;

a color temperature increasing unit, configured to: when the displayed content is a single text, increase a screen display color temperature of the intelligent terminal;

a display mode switching unit, configured to: when the displayed content is a game, compare game time with a second time threshold; and when the game time is greater than the second time threshold, switch, by the eye protection software, a display mode of the intelligent terminal to a black-and-white display mode; and a communication mode switching unit, configured to: when the time that the game time is greater than the second time threshold is greater than a third time threshold, switch, by the eye protection software, an operating mode of the intelligent terminal to a basic communication mode.

8. The eye protection system for the intelligent terminal according to claim 5, wherein the third eye protection scheme execution module specifically comprises:

a facial information acquiring unit, configured to acquire, by the camera, facial information of the user;

a use time determining unit, configured to obtain time that the user uses the intelligent terminal according to the comparison between the facial information and the information stored by the intelligent terminal;

a display mode switching unit, configured to: when the time of using the intelligent terminal is greater than a fourth time threshold, switch, by the eye protection software, a display mode of the intelligent terminal to a black-and-white display mode, and sending a reminder message for rest; and a display mode maintaining unit, configured to: when the rest time is less than a fifth time threshold, maintain the display mode of the intelligent terminal to the black-and-white display mode.

* * * * *